United States Patent
Hetzel et al.

(10) Patent No.: US 7,502,588 B2
(45) Date of Patent: Mar. 10, 2009

(54) DISSEMINATION SYSTEM FOR SATELLITE BROADCASTING

(75) Inventors: Herbert Hetzel, Schweigen-Rechtenbach (DE); Rainer Klos, Ettlingen-Oberweier (DE); Patrick Heck, Durmersheim (DE); Christian Thiel, Brannenburg (DE)

(73) Assignee: SMSC Europe GmbH, Karlsruhe (DE)

( * ) Notice: Subject to any disclaimer, the term of this patent is extended or adjusted under 35 U.S.C. 154(b) by 612 days.

(21) Appl. No.: 11/147,141

(22) Filed: Jun. 7, 2005

(65) Prior Publication Data

US 2006/0030259 A1 Feb. 9, 2006

Related U.S. Application Data

(63) Continuation of application No. PCT/EP03/14114, filed on Dec. 12, 2003.

(30) Foreign Application Priority Data

Dec. 12, 2002 (DE) ................. 102 58 331
May 26, 2003 (DE) ................. 103 24 122

(51) Int. Cl.
*H04Q 7/20* (2006.01)
(52) U.S. Cl. ............ 455/3.02; 455/3.01; 455/3.04; 455/2.01; 455/3.05; 455/3.06; 725/20; 725/151; 725/63; 725/68; 725/70
(58) Field of Classification Search ........... 455/3.01, 455/3.02, 3.04, 2.01, 422.1, 403, 500, 517, 455/3.05, 3.06, 427, 431, 67.11, 14, 21, 20, 455/513; 725/78, 151, 20, 63, 68, 70, 71, 725/72, 74, 81, 83, 85
See application file for complete search history.

(56) References Cited

U.S. PATENT DOCUMENTS

| | | | |
|---|---|---|---|
| 5,404,505 A | | 4/1995 | Levinson |
| 5,521,631 A | * | 5/1996 | Budow et al. ........... 725/78 |
| 5,787,335 A | | 7/1998 | Novak |
| 5,805,975 A | | 9/1998 | Green, Sr. et al. |
| 5,995,258 A | | 11/1999 | Weber et al. |
| 6,134,419 A | * | 10/2000 | Williams ............... 725/151 |
| 6,211,844 B1 | * | 4/2001 | Davi et al. .............. 343/876 |

(Continued)

FOREIGN PATENT DOCUMENTS

DE   4012657   10/1991

(Continued)

OTHER PUBLICATIONS

International Search Report, PCT/EP03/14114, mailed Jun. 1, 2004.

(Continued)

*Primary Examiner*—Keith T Ferguson
(74) *Attorney, Agent, or Firm*—Kevin L. Daffer; Daffer McDaniel, LLP

(57) ABSTRACT

A dissemination system for satellite broadcasting comprises a satellite receiving antenna for receiving satellite signals, receivers for demodulating the signals received by the antenna, and a line system for relaying the signals to a plurality of subscribers, in which the receivers are assigned to the satellite receiving antenna in close spatial proximity, and only demodulated or decoded signals are relayed to the subscribers by means of the line system.

14 Claims, 3 Drawing Sheets

U.S. PATENT DOCUMENTS 6,486,907 B1 11/2002 Farber et al.
2002/0150061 A1 10/2002 Arsenault
2002/0154055 A1* 10/2002 Davis et al. .................. 342/352

FOREIGN PATENT DOCUMENTS

| DE | 195 28 589 | 1/1997 |
|---|---|---|
| DE | 10206385 | 9/2002 |
| EP | 1 009 113 | 6/2000 |
| WO | 00/13408 | 3/2000 |
| WO | 01/56297 | 8/2001 |
| WO | 02/25847 | 3/2002 |

OTHER PUBLICATIONS

Schopp et al., "Video and Audio Applications in Vehicles Enabled by Networked Systems," IEEE International Conference on Consumer Electronics, 1999, pp. 218-219.

* cited by examiner

DISSEMINATION SYSTEM FOR SATELLITE BROADCASTING

CROSS REFERENCE TO RELATED APPLICATIONS

This application is a continuation of pending International Application No. PCT/EP2003/014114 filed Dec. 12, 2003, which designated the United States and claims priority from German Applications Nos. 102 58 331.5 filed Dec. 12, 2002 (now abandoned) and 103 24 122.1 filed May 26, 2003.

BACKGROUND OF THE INVENTION

1. Field of the Invention

The invention relates to a dissemination system for satellite broadcasting and related services.

2. Description of the Prior Art

Conventional dissemination systems for satellite broadcasting, as described for example in U.S. Pat. No. 5,787,335, are based on distributing analog high frequency signals by means of coaxial cables. Two cable strands are employed for a simultaneous transmission of signals having two polarizations. An improvement to the above-mentioned system is indicated in U.S. Pat. No. 5,805,975, in which signals of a second polarization are converted to a different frequency region. However, a substantially more broadband cable, and also a more broadband distribution system are needed to realize such an improvement. The problem with arrangements of this kind is that the bandwidth available with conventional cable systems is far less than adequate for distributing all transmittable channels, particularly with simultaneous reception from a plurality of satellites.

Another improvement is provided by receiving systems having controllable terminal stations, as described for example in DE 195 28 589 C1. In these systems, a desired channel is converted, in accordance with a channel selection made by individual subscribers, to an intermediate band that can be transmitted via a coaxial cable. The disadvantage of a solution of this kind is the high complexity of the terminal station, attended by low flexibility. Thus, only receivers which are specially adapted for communication with the terminal station can be employed.

Another approach is made in U.S. Pat. No. 5,995,258. In this approach, a complete optical bus system is described in which the signals received from a satellite are transmitted in a base band. Different optical wavelengths are used for simultaneous transmission of a plurality of polarizations, or for communication in the opposite direction. This system has the disadvantages of an extremely high complexity, a high outlay of optical components, and at the same time a low transmission quality by optical signal transmission in the base band.

A simplified solution to the above approach is represented by U.S. Pat. No. 6,486,907 B1. In this solution, a simplified optical system is described in which the signals are also transmitted in the base band without further modulation. The disadvantage of this arrangement consists of a low transmission quality owing to the optical signal transmission in the base band.

BRIEF SUMMARY OF THE INVENTION

The invention is based on the object of designing a distribution system for satellite broadcasting which is not attended by the above-mentioned disadvantages, and is suitable for a simultaneous connection of a large number of subscribers with high flexibility and at low cost.

In accordance with the invention the above object is achieved by a dissemination system for satellite broadcasting, comprising at least one satellite receiving antenna for receiving satellite signals; at least one preamplifier with an optional frequency converter (LNB) for amplifying the received satellite signals; at least one receiver for performing at least one of demodulating and decoding of the signals amplified by the preamplifier; and a digital bus system based optionally on electrical lines or light-wave lines and comprising a bus interface for relaying the signals from the receiver to at least one subscriber; wherein the at least one preamplifier with the optional frequency converter, the at least one receiver and the bus interface are assigned to the at least one satellite receiving antenna, and are adapted to relay at least one of the demodulated and decoded signals to the at least one subscriber by means of the bus system.

In the following, reference will be made exclusively to the concept of satellite broadcasting for reasons of clarity of presentation. This includes services such as satellite TV and satellite radio, in analog and digital form, and also purely digital services such as a distribution of internet data via satellite channels.

A dissemination system in accordance with one embodiment of the invention comprises at least one satellite receiving antenna for receiving the satellite signals, at least one LNB (Low Noise Block) as a preamplifier, and also at least one receiver for demodulating the signals received by the antenna. Furthermore, at least one bus system is provided for disseminating the signals to at least one subscriber. Other components which, although necessary for the operation of the system, but not essential to the invention by itself, will not be further discussed here.

As distinct from prior art, the receiver(s) are not located on the subscribers' side, but are assigned to the satellite receiving antennas. In accordance with generally prevalent technical language usage, the term "receivers" should not be confused with "frequency converters," which generally function to convert a signal to another frequency band. Rather, the term "receivers" should be understood to comprise those units which demodulate the signals and, if necessary, decode them.

In accordance with the invention, at least one LNB, any necessary frequency converters, and at least one receiver together with a bus interface are assigned to at least one antenna. Thus according to the invention only demodulated and/or, if desired or necessary, decoded signals are further disseminated to the subscribers by means of the bus system. This means, of course, that receivers for demodulating or decoding the signals are no longer needed in the subscribers themselves. Here the term "decoding" relates to specific kinds of decoding, such as those used for high-frequency transmission of the satellite signals from satellites to terrestrial receivers. Of course, the demodulated signals may be subsequently encoded by the receivers for transmission via the bus system in accordance with the bus system standard. Encodings which usually can be evaluated by audio and video instruments that do have not have their own HF receiving unit, such as MP3 or similar standards, need not be decoded as a matter of necessity. Therefore signals encoded in this manner may be relayed to the subscribers even without decoding.

Preferably an integration in close spatial proximity to the antenna is effected by arranging a preamplifier having an optional frequency converter (LNB), a receiver, and also a bus interface with in a receiving unit. A receiving unit composed of these components in accordance with the invention may be accommodated, for example, in a single housing and, preferably (as is conventionally used in accordance with prior art for LNBs) mounted on the antenna.

As used herein, the term "antenna" refers to a conventionally used reflector, such as, for example, a parabolic mirror. A mode converter, such as, for example, a horn radiator, which is used for converting free-space modes to modes of electromagnetic waves guided along a line, may be assigned to the reflector or to the preamplifier. Preferably, however, it is assigned to the preamplifier. Basically, arbitrary reflector shapes or antenna shapes may be employed within the scope of the invention. Similarly, in accordance with the invention, active or passive array antennas are usable. For this, of course, at least one LNB, any frequency converters which may be necessary, and also at least one receiver are integrated in a receiving unit together with a bus interface in the antenna itself.

According to the invention, the bus system is based on electrical lines and particularly on light-wave guides. Alternatively, this may also be a narrow-band radio system or even a wireless LAN. Systems of this kind, for example many for the 13 cm band, are presently on offer.

Another embodiment of the invention relates to the design of the bus system as a digital bus system. As a rule, bidirectional communication is possible in bus systems of this kind. Therefore, it is particularly easy for the subscribers to inform an associated receiver of the channel of the satellite band it is to receive and demodulate. Similarly, a series of additional communication possibilities exist via the bus system. Thus, for example, further parameters such those concerning signal quality or other information such as the time of day may be transmitted. Furthermore, with a bus system of this kind an intelligent control may be effected. If, for example, two or more subscribers request the same channel, then it is now possible to notify these subscribers of the receiver that is presently demodulating the requested channel, or of the data stream in which the desired packages are to be found. Thus, a multiple demodulation of the same channel by a plurality of receivers is dispensed with. This is of particular advantage with large systems, because there may be a high probability of at least some subscribers requesting the same channel. Thus, the number of receivers may be chosen to be smaller than the number of subscribers. This leads to a further saving of cost.

Furthermore, the bus system may be employed not only for disseminating the satellite signals, but additionally also for data transmission, such as, for example, in PC networks, or for building automation. Thereby it becomes only still necessary to provide a single network infrastructure that will cope with all possible communication tasks in a building. In comparison with known solutions having a plurality of network or cable systems, this leads to an enormous saving of cost.

In another embodiment of the invention, at least one receiver is adapted for real-time encoding of the received signals into at least one digital video format. Digital video formats of this kind may be, for example, MPEG or formats derived therefrom or related thereto. Because the received signals are encoded into a video format of this kind, only very strongly reduced amounts of data need to be transmitted via the line system or via the digital bus. Thereby a large number of different channels may be transmitted simultaneously via a simple bus infrastructure.

Furthermore, in an advantageous manner the subscribers may be designed at particularly favorable cost, because they now require only standard decoders, such as MPEG decoders, for example. Thus, simple MPEG decoders which, for example, may be embodied in PCs by means of software, or are in any case integrated in DVD players, may be employed in place of customary satellite receivers that require much outlay. This leads to a strong reduction of the cost of the entire system.

In another embodiment of the invention, the dissemination system may further comprise at least one diversity unit which filters out from the signals of a plurality of receivers, and transmits to the subscribers, the particular signal that has the best quality. The filtering may be effected optionally by using the demodulated signals of receivers, or also by using digital signals which are transmitted via a bus. It is particularly easy to select the best channel when a receiver, during real-time encoding of the signals, computes a quality parameter and transmits this to the diversity unit. Thus, using this parameter, the diversity unit may perform a simple selection of the best channel.

A method for disseminating satellite broadcast signals in accordance with the invention comprises the following steps: receiving the satellite signals by means of at least one satellite antenna, demodulating the received signals, transferring the signals to a digital bus system having a bus interface integrated in the antenna, and disseminating the demodulated signals via a line system to at least one subscriber.

BRIEF DESCRIPTION OF THE DRAWINGS

In the following the invention will be described by way of example, without limitation of the general inventive concept, with the aid of examples of embodiment and with reference to the drawings.

DETAILED DESCRIPTION OF THE INVENTION

Figure 1:
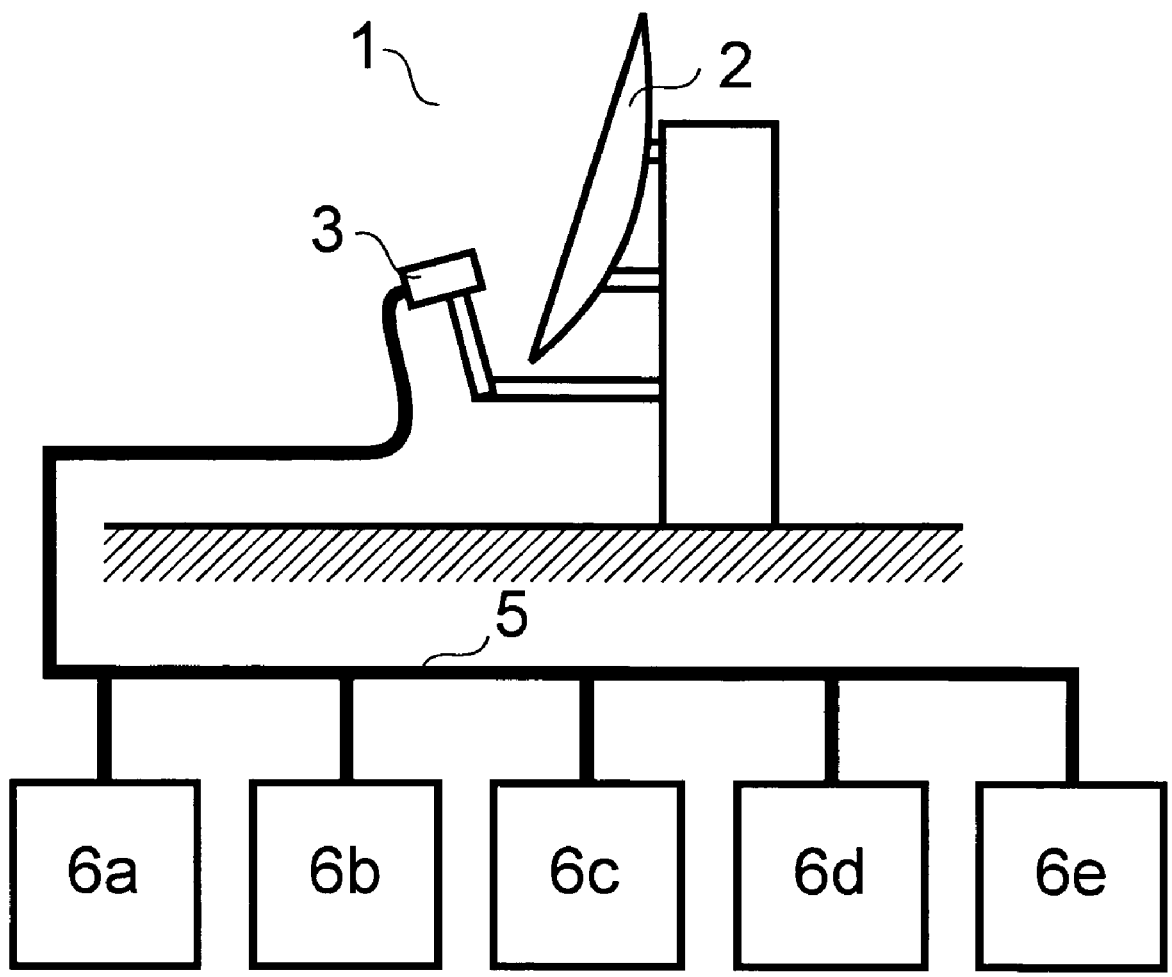
FIG. 1 schematically shows in a general form a device in accordance with the invention.
Figure 2:
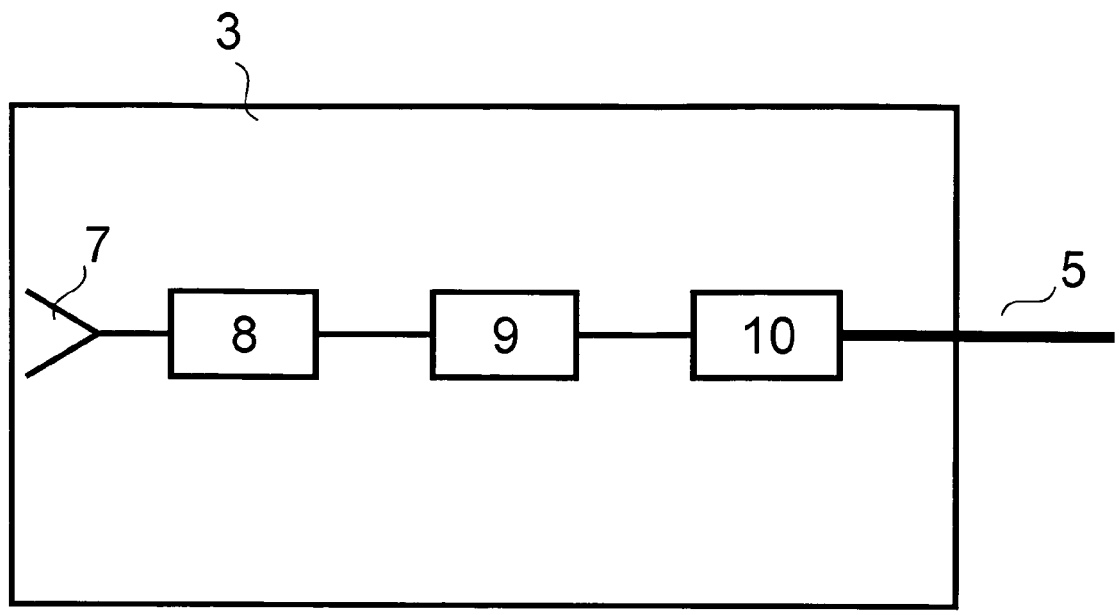
FIG. 2 schematically shows in a general form the structure of a receiving unit.

The dissemination system illustrated, e.g., in FIG. 1 comprises a satellite receiving antenna 1 for receiving satellite signals. This antenna comprises at least one reflector 2. Furthermore, a receiving unit 3 is provided to contain all components which are necessary for tapping the signals concentrated by the reflector, and for converting and issuing them as digital signals onto a bus system 5. These components may include, for example, mode converters 7, preamplifiers 8, and also receivers 9, as shown in FIG. 2. The signals received and demodulated in the receiving unit 3 are converted to a suitable digital form that can be transmitted via the bus system 5 to individual subscribers 6a, 6b, 6c, 6d.

With this arrangement the receiving unit 3 is not mounted on the subscribers' side, but in the immediate vicinity of the satellite receiving antenna 1.

One embodiment of a receiving unit 3 is illustrated schematically in FIG. 2. A mode converter 7, for example a horn antenna, picks up the electromagnetic waves concentrated by the reflector 2 and converts them to waves guided along a line. These are then amplified by a preamplifier 8, and also demodulated and, if necessary, decoded by a receiver 9 disposed to follow. For communication between the receiver 9 and the subscribers 6 by means of the bus system 5, a bus interface 10 is provided. This bus interface may be optionally designed to be bidirectional, so that it can not only send out signals to the bus, but can also receive signals from the bus. Thereby, for example, certain operating conditions such as the selection, or also the blockage of particular channels, may be signaled to the receiving unit.

Figure 3:
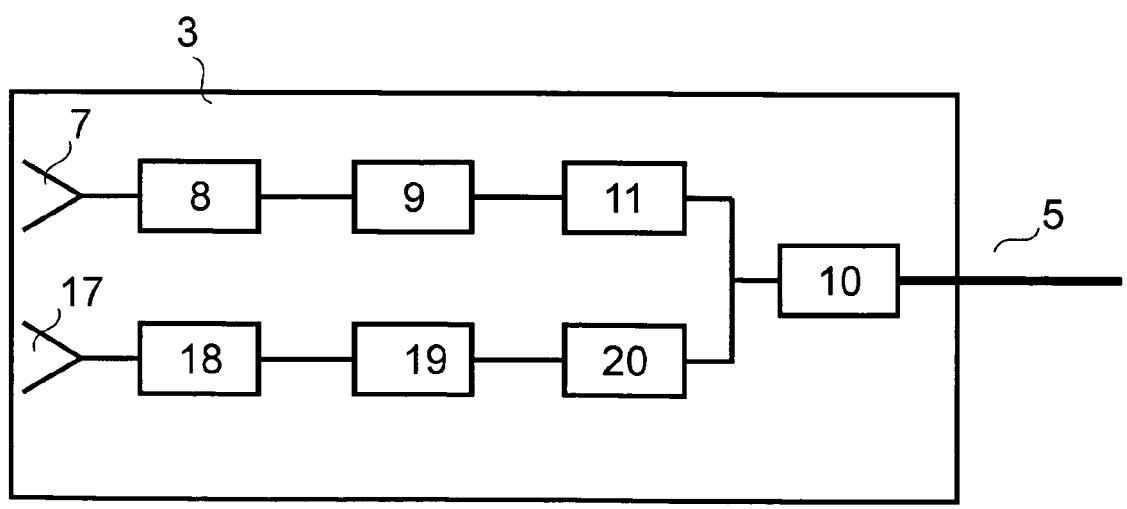
FIG. 3 shows a receiving unit having a plurality of receivers.

FIG. 3 schematically shows an example of another embodiment of a receiving unit 3 having two receivers. In this embodiment, two mode converters 7, 17 are provided for issuing electrical signals to preamplifiers 8, 18. The amplified signals are then guided to corresponding receivers 9, 19 for demodulation. The demodulated signals are now connected with an (external) bus interface 10 by means of local bus interfaces 11, 20. For this, an internal bus exists between the bus interfaces 11, 20, 10. This internal bus may be, for example, a synchronous bus suitable for multimedia, such as a MediaLB.

Of course, in correspondence with the example embodiment of FIG. 3, further receivers also may be combined with each other. A combination is also possible in accordance with prior art, for example via multiplexers (channel switches). However, the combination via a local bus, as illustrated here, is substantially more flexible and capable of better performance. Of course, the bus system 5 also may be used in place of the local bus.

Figure 4:
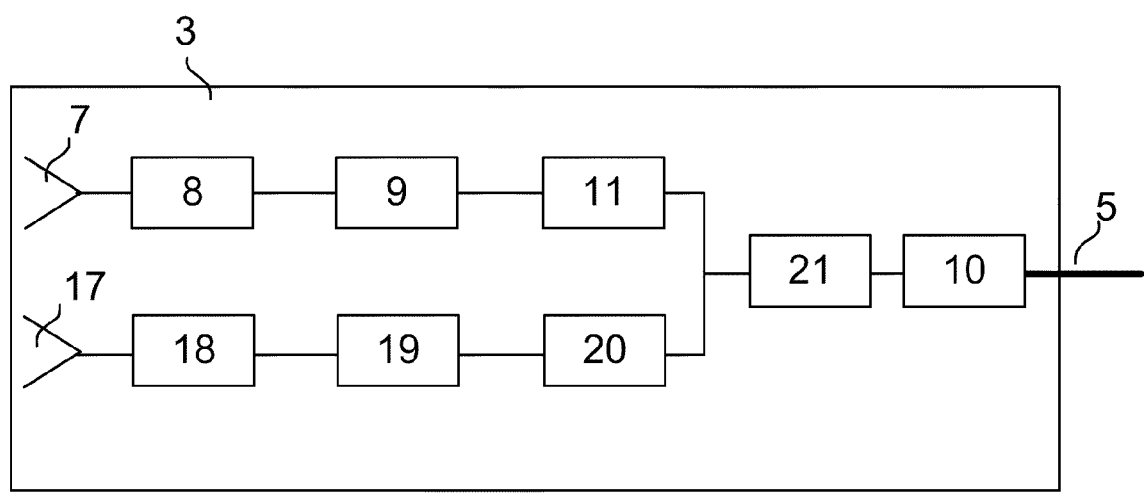
FIG. 4 shows a receiving unit having a plurality of receivers for demodulating and/or decoding a plurality of satellite signals, and a diversity unit for selecting the demodulated signal having the best quality.

Another embodiment of the receiving unit 3 is shown schematically in FIG. 4. Similar to the embodiment shown in FIG. 3, the receiving unit shown in FIG. 4 may include a plurality of mode converters (e.g., 7 and 17), a plurality of preamplifiers (e.g., 8 and 18), a plurality of receivers (e.g., 9 and 19), a plurality of local bus interfaces (e.g., 11 and 20) and an external bus interface (e.g., 10). In addition to the components described above, the receiving unit of FIG. 4 may also include at least one diversity unit (21) which filters out from the signals of the plurality of receivers, and transmits to the subscribers, the particular signal that has the best quality. The filtering out of a best quality signal may be effected by selecting a best one of the demodulated signals from the receivers, or by selecting a best one of the digital signals which are transmitted via the local bus. In one example, the diversity unit may select the best channel or signal when the receivers are configured for providing real-time encoding of the received signals. During real-time encoding, for instance, the receivers may compute a quality parameter and transmit this parameter to the diversity unit. The diversity unit may then use this parameter to perform a simple selection of the best channel or the signal having the best quality.

In some cases, at least one receiver (e.g., 9 or 9/19, as shown in FIGS. 2-4) may be adapted for real-time encoding of the received satellite signals into at least one digital video format. Digital video formats of this kind may be, for example, MPEG or formats derived there from or related thereto. One advantage to encoding the received satellite signals into a video format is that only very strongly reduced amounts of data need be transmitted via the digital bus system 5. This enables a large number of different channels to be transmitted simultaneously via a simple bus infrastructure. Another advantage to digital video encoding is that the subscribers 6 may be designed at particularly favorable cost, because they now require only standard decoders, such as MPEG decoders, for example. Thus, simple MPEG decoders which, for example, may be embodied in PCs by means of software, or are in any case integrated in DVD players, may be employed in place of customary satellite receivers that require much outlay. This leads to a strong reduction of the cost of the entire system.

The invention claimed is:

1. Dissemination system for satellite broadcasting, comprising:
    at least one satellite receiving antenna for receiving a plurality of satellite signals;
    at least one preamplifier with an optional frequency converter for amplifying the received satellite signals;
    at least one receiver for performing at least one of demodulating and decoding of the signals amplified by the preamplifier;
    at least one diversity unit for selecting, from amongst the demodulated signals, a particular signal having a best quality;
    a digital bus system comprising a bus interface for relaying the particular signals from the diversity unit to at least one subscriber; and
    wherein the at least one preamplifier, the at least one receiver, and the bus interface are assigned to the at least one satellite receiving antenna, and are adapted to relay the particular signal to the at least one subscriber by means of the bus system.

2. Dissemination system according to claim 1, wherein the at least one preamplifier, the at least one receiver, and the bus interface are integrated into a receiving unit.

3. Dissemination system according to claim 2, wherein the receiving unit is accommodated in a housing, which is mounted to the antenna.

4. Dissemination system according to claim 2, wherein the at least one diversity unit is also integrated within the receiving unit.

5. Dissemination system according to claim 1, wherein the digital bus system is configured for performing further communication tasks including those performed by a PC network, or for building automation.

6. Dissemination system according to claim 1, wherein the at least one receiver is adapted for real-time encoding of signals to a digital video format.

7. Dissemination system according to claim 6, wherein the digital video format comprises MPEG.

8. Dissemination system according to claim 1, wherein the at least one subscriber is adapted to receive data in a digital video format.

9. Dissemination system according to claim 8, wherein the digital video format comprises MPEG.

10. Dissemination system according to claim 1, wherein the digital bus system is configured for relaying signals on electrical lines or light-wave lines.

11. Dissemination system according to claim 1, wherein the at least one receiver is adapted to compute a quality parameter for each of the signals demodulated by the at least one receiver, and wherein the at least one diversity unit is adapted to use the quality parameter to select the particular signal having the best quality.

12. Method for dissemination of satellite broadcast signals, comprising the following steps:
    receiving a plurality of satellite signals by means of at least one satellite antenna;
    demodulating the received satellite signals;
    selecting one of the demodulated signals having the best quality;
    transferring the selected signal to a digital bus system having a bus interface integrated in the satellite antenna; and
    disseminating the selected signal via the digital bus system to at least one subscriber.

13. Dissemination system for satellite broadcasting, comprising:

at least one satellite receiving antenna for receiving satellite signals;

at least one preamplifier with an optional frequency converter for amplifying the received satellite signals;

at least one receiver for demodulating the signals amplified by the at least one preamplifier, wherein the at least one receiver is adapted for real-time encoding of the demodulated signals into a digital video format;

a digital bus system comprising a bus interface for relaying the encoded signals from the at least one receiver to at least one subscriber; and wherein the at least one preamplifier, the at least one receiver and the bus interface are integrated into a receiving unit, which is accommodated in a housing and mounted to the at least one satellite receiving antenna.

14. Dissemination system according to claim 13, wherein the digital video format comprises MPEG.

* * * * *

UNITED STATES PATENT AND TRADEMARK OFFICE
CERTIFICATE OF CORRECTION

PATENT NO. : 7,502,588 B2
APPLICATION NO. : 11/147141
DATED : March 10, 2009
INVENTOR(S) : Hetzel et al.

It is certified that error appears in the above-identified patent and that said Letters Patent is hereby corrected as shown below:

IN THE CLAIMS:

Claim 1 at col. 6, line 15, after "the particular," please delete "signals" and substitute therefor --signal--.

Signed and Sealed this

Sixteenth Day of June, 2009

JOHN DOLL
*Acting Director of the United States Patent and Trademark Office*